(12) United States Patent
Ge et al.

(10) Patent No.: US 10,735,527 B1
(45) Date of Patent: Aug. 4, 2020

(54) DRIVING HIGH QUALITY SESSIONS THROUGH OPTIMIZATION OF SENDING NOTIFICATIONS

(71) Applicant: Microsoft Technology Licensing, LLC, Redmond, WA (US)

(72) Inventors: Jiaqi Ge, Sunnyvale, CA (US); Yiping Yuan, Sunnyvale, CA (US); Ajith Muralidharan, Sunnyvale, CA (US); Padmini Jaikumar, Sunnyvale, CA (US); Shipeng Yu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/264,322

(22) Filed: Jan. 31, 2019

(51) Int. Cl.
  *G06F 15/177* (2006.01)
  *H04L 29/08* (2006.01)

(52) U.S. Cl.
  CPC .......... *H04L 67/147* (2013.01); *H04L 67/22* (2013.01); *H04L 67/306* (2013.01)

(58) Field of Classification Search
  CPC ...... H04L 67/147; H04L 67/22; H04L 67/306
  See application file for complete search history.

(56) References Cited

U.S. PATENT DOCUMENTS

| | | | | |
|---|---|---|---|---|
| 6,981,040 B1 * | 12/2005 | Konig | ................. | H04L 67/20 |
| 9,813,495 B1 * | 11/2017 | Van Rensburg | ........ | H04L 51/14 |
| 2005/0119910 A1 * | 6/2005 | Schneider | ............ | G06F 16/972 709/203 |
| 2010/0325214 A1 * | 12/2010 | Gupta | .................. | G06Q 10/10 709/206 |
| 2012/0284638 A1 * | 11/2012 | Cutler | ................... | G06Q 10/00 715/751 |
| 2015/0156249 A1 * | 6/2015 | Draznin | ................ | G06Q 10/10 709/204 |
| 2017/0024807 A1 * | 1/2017 | Jhamtani | ............ | G06Q 30/0641 |
| 2017/0249557 A1 * | 8/2017 | Tendick | ................ | G06Q 30/02 |
| 2018/0114453 A1 * | 4/2018 | Jain | ........................ | G09B 5/065 |
| 2018/0367483 A1 * | 12/2018 | Rodriguez | ............ | H04L 51/046 |

* cited by examiner

*Primary Examiner* — Philip B Tran
(74) *Attorney, Agent, or Firm* — Hickman Palermo Becker Bingham LLP (57) ABSTRACT

Technologies for determining whether to send a notification to an entity is provided. Disclosed techniques include receiving entity features describing attributes related to observed entity sessions. A set of entity-specific session features values may be generated from the received entity features. A session-quality prediction model may be generated using the set of entity-specific session feature values. The session-quality prediction model may determine an expected session score for a new entity session for an entity, where the expected session score describes a level of interaction for the new entity session. A notification may be received for a particular entity. The session-quality prediction model may be used to determine the expected session score for a new entity session for the particular entity. A determination may be made as to whether a notification should be sent to the particular entity based upon the expected session score for the new entity session.

20 Claims, 3 Drawing Sheets

DRIVING HIGH QUALITY SESSIONS THROUGH OPTIMIZATION OF SENDING NOTIFICATIONS

CROSS-REFERENCE TO RELATED APPLICATIONS; BENEFIT CLAIM

This application is related to U.S. patent Ser. No. 15/884,527, entitled "Predicting Site Visit based on Intervention" on Jan. 31, 2018, the entire content of which is hereby incorporated by reference for all purposes as if fully set forth herein.

TECHNICAL FIELD

The present disclosure relates to determining whether to send a notification indicating available content items to an entity, and more specifically, to computer software that models entity session features to determine whether a new entity session for the entity is expected to result in a particular level of interaction in response to sending a notification to the entity.

BACKGROUND

Content platforms provide a platform where users may share and consume content. Content platforms monitor content related to users and notify users when content is ready to be consumed. For example, content platforms may notify a user when the user has pending content items in their feed, pending invitations to connect with other users, and any other content item update that may be of interest to the user. Notifications are sent to users to inform users of the pending content. In response, users may initiate a new user session on the content platform to interact with pending content.

Content platforms dedicate significant resources to generating and sending notifications to users in order to cause users to engage with the content platform by initiating a new user session. Content platforms may optimize when notifications are sent to users based upon many factors such as the amount of pending content for the user and the frequency in which the user engages in a user session. Metrics for such factors allow content platforms to schedule notification messages in order to maximize the probability that a user will initiate a new user session. However, initiating a new user session does not guarantee that the new user session results in quality user engagements. User sessions may include very short sessions, where a user engages in few (if any) activities and may only be online for a few seconds, or longer sessions, where a user engages in many different activities and the session lasts for several minutes. Shorter user sessions may not result in the level of engagement desired by the content platform. Also, shorter sessions are a sign of user dissatisfaction in the content platform. Therefore, conventional approaches to optimize notifications to increase the probability of a new user session may not result in the desired effect of increasing user engagement.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As disclosed herein, determining whether to send a notification to an entity of a content platform in order to cause a new entity session is improved by adding technology that implements a particular approach of analyzing entity session features and determining whether to send a notification to the entity in order to cause a new entity session that results in a desired level of interaction from the entity. One particular approach may receive entity features describing attributes related to observed entity sessions and received entity notifications for a plurality of entities on a content platform. A set of entity-specific session feature values for a set of entity-specific session features that describe attributes of entity sessions for the plurality of entities may be generated from the received entity features. A session-quality prediction model may be generated using the set of entity-specific session feature values. The session-quality prediction model may determine an expected session score for a new entity session for an entity, where the expected session score describes a level of interaction for the new entity session.

One particular approach may determine that a notification is available for a particular entity and a particular number of content items available for the particular entity may be identified. The session-quality prediction model may be used to determine the expected session score for a particular new entity session for the particular entity based upon the particular number of content items available for the particular entity. A determination may be made as to whether a notification should be sent to the particular entity based upon the expected session score for the particular new entity session.

The disclosed approaches provide advantages over conventional solutions by generating a session-quality prediction model that may be used to determine whether a notification should be sent to the particular entity in order to trigger a new entity session that will result in an expected level of interaction with the entity. Conventional solutions provide notification delivery optimization that optimizes when to send a notification in order to maximize the likelihood of the entity initiating a new entity session. However, the conventional solutions do not factor in whether the new entity session will have an expected level of interaction or no, thereby reducing the effectiveness of a new entity session when the new entity session has a low level of interaction. The disclosed approaches provide greater efficiency of sending meaningful notifications at particular times in order to trigger a new entity session that results in the desired level of interaction with the content platform. For example, with the disclosed approaches, fewer notifications may be sent, thus preserving valuable system processing and memory resources.

System Overview

Figure 1:
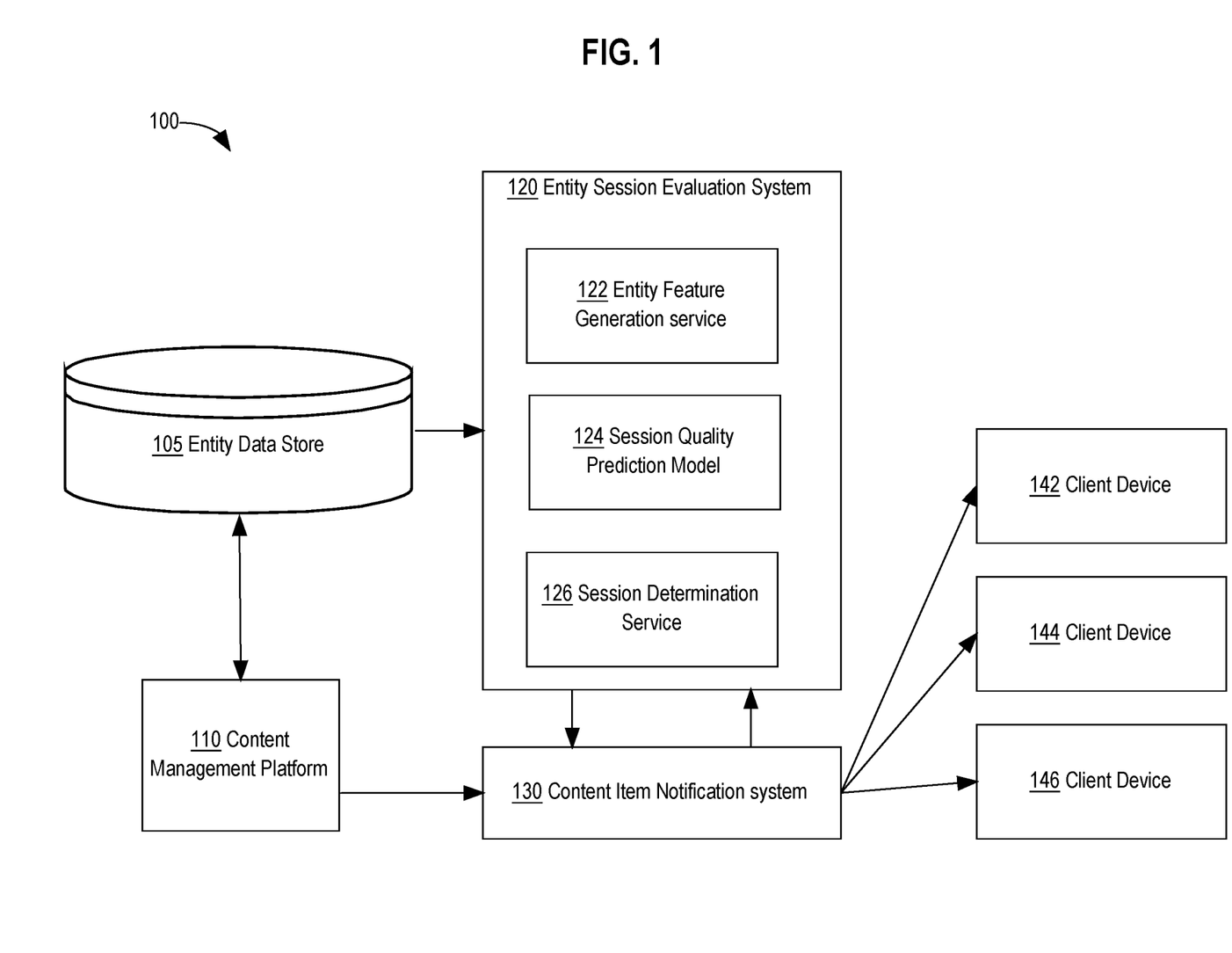
FIG. 1 is a block diagram that depicts a system for managing and sending notifications of available content items to one or more end-users, in an embodiment.

FIG. 1 is a block diagram that depicts a system 100 for managing and sending notifications of available content items to one or more end-users, in an embodiment. System 100 may represent a content platform that includes an entity data store 105, a content management platform 110, an entity session evaluation system 120, a content item notification system 130, and client devices 142-146. Although a single content management platform is depicted, system 100 may include additional content management platforms. Similarly, system 100 may include additional content item notification systems.

In an embodiment, the content management platform 110 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide an entity with access to content items and/or provide the content items to the entity. For example, the content management platform 110 may allow a user to consume, upload, search for, approve of (e.g. "like"), dislike, and/or comment on content items.

Examples of a content items may include, but are not limited to, messages, articles, media such as pictures, video, and sound clips, invitations to connect, and any other event or object that may be consumed by an entity. Entities may refer to users, user profiles, companies, company profiles, or any other object that may represent a group, a place, or thing. For the purposes of this disclosure the terms entity, user, user profile, company, or company profile may be used interchangeably. An entity session may refer to a period of activity between when an entity logs into the content platform and the entity logs out of the content platform. For example, entity Jane Smith may initiate an entity session by logging into the content platform. Jane Smith may visit several pages, and then end her entity session by logging out or by not interacting with the content platform for a period of time.

In an embodiment, the content management platform 110 may track entity sessions and store related entity session metrics in the entity data store 105. Entity session metrics may include, but are not limited to, time and date of the entity session, the entity who initiated the entity session, the duration of the entity session, number of actions performed and number of pages visited during the entity session, and entity specific metrics describing the number and type of content items available for consumption prior to initiating the entity session. An example of content items available for consumption prior to initiating the entity session may include the number of unread content items in the entity's feed and/or the number of unread badge items for the entity.

For instance, Jane Smith may have had 20 unread content items in her feed prior to initiating the entity session. Badge items may refer to a number of non-feed related content items available for consumption, such as new messages, email, push notification, or any other content item. In one example, badge items may be displayed within as a number within a red background circle that overlays a corner of an application icon. In an embodiment, the content management platform 110 may also generate entity-specific aggregated metrics that describe metrics related to entity sessions initiated by specific entities. For example, the content management platform 110 may generate aggregated metrics that describe an average daily number of page views for Jane Smith, a daily average number of available content items in Jane Smith's feed, an average duration of entity sessions for Jane Smith, and any other metric that may be aggregated for the entity Jane Smith.

In an embodiment, the entity data store 105 may represent data storage that stores data related to entities, entity session metrics, and aggregated entity session metrics. The stored data may be accessed by the content management platform 110 and the entity session evaluation system 120.

In an embodiment, the content item notification system 130 generates notification messages for entities and sends the notification messages to client devices 142-146 for corresponding entities. The content item notification system 130 may receive a request, from the content management platform 110, that contains one or more pending content items that are available for consumption by a target entity. For example, if the target entity has 8 new content items in their content item feed, then the content management platform 110 may send a request to generate a notification to the content item notification system 130. The content item notification system 130 may send the request to the entity session evaluation system 120 to determine whether a new entity session for the target entity will result in the entity session having a desired level of interactions by the target entity. The determination whether a new entity session will have the desired level of interaction by the target entity, assumes that a new entity session will be initiated by the target entity in response to receiving the notification.

In an embodiment, the content item notification system 130 may determine whether sending a notification will trigger a new entity session based upon past entity session behavior by entities and the type and number of content items available for consumption by the target entity.

In an embodiment, the desired level of interaction may define whether an entity session is a high-quality entity session or whether the entity session is a low-quality entity session. A level of interaction during an entity session may be used to determine the level of quality of an entity session. For example, if entity Jane Smith initiates an entity session in which she clicks on very few content items, visits very few pages, or the duration of the entity session is only a few seconds long, then the entity session may be classified as a low-quality entity session. In an embodiment, entity session metrics to quantify a level of interaction may include, but is not limited to, a number of pages visited during the session, the duration of the session, and the number of actions performed during the session, where actions may represent articles posted, comments posted, clicks made, likes made, messages generated within pages during the session, or any other action performed by the entity.

In an embodiment, the entity session evaluation system 120 may determine, based upon entity session metrics and entity-specific metrics for a target entity, whether a new entity session for the target entity will likely be a high-quality entity session using a session quality prediction model. The entity-session prediction model may represent a machine-learning model that is used to determine whether a new entity session will have a desired level of interaction based upon target entity attributes and historical entity session attributes for the target entity. The entity session evaluation system 120 may comprise an entity feature generation service 122, a session quality prediction model service 124, and a notification trigger service 126.

In an embodiment, the entity feature generation service 122 receives entity and entity session features describing attributes related to observed entity sessions including entity specific attributes describing how often an entity engages with content items on the content platform. The entity feature generation service 122 may generate a set of entity-specific feature values from the entity and entity session features for the purpose of generating and training the entity-session prediction model. The set of entity-specific feature values may include, but are not limited to, snapshots of real-time entity session features, entity-specific aggregated metrics, and entity profile features. Snapshots of real-time entity features may include the number of unread content items in the target entity's feed and/or the number of unread badge items for the entity at the time of initiating an entity session. For example, entity Jane Smith may have previously initiated an entity session where she had 12 unread content items in her feed and 6 unread badge items. Entity profile features may include attributes such as an entity's age, gender, and number of entity connections. The number of entity connections may be further classified based on the type of entity connections, such as the number of connections who are daily active entities, weekly active entities, or monthly active entities.

In an embodiment, the session quality prediction model service 124 may generate the session-quality prediction model using the set of entity-specific feature values as training input. The session-quality prediction model may be implemented as a machine-learning model that determines a probability score describing whether a newly created entity session will result in a level of interaction desired by the entity session evaluation system 120. In an embodiment, the session-quality prediction model may be implemented as a logistic regression classifier that produces probability output value for a binary classification, where the binary classification indicates whether an entity session will be a high-quality entity session. A high-quality entity session may be defined as either a threshold number of pages viewed during the entity session, a threshold duration of time for the entity session, or a threshold number of actions performed during the entity session. In another embodiment, the high-quality session may be defined as a combination of either one of the listed metrics.

In another embodiment, the session-quality prediction model is implemented to determine a discrete level of interaction that may be expected from a new entity session. For example, the session-quality prediction model may be a regression model trained to output numeric responses such as the expected number of pages to be viewed during the entity session, the expected duration of the entity session, or the expected number of actions to be performed during the entity session.

In an embodiment, the session quality prediction model service 124 generates an expected session score using the session quality prediction model in response to receiving model input specifying entity-specific information about a specific entity and notification information for a pending notification, which includes a number of available content items for consumption by the specific entity.

In an embodiment, the notification trigger service 126 may receive the expected session score for a potential entity session and determine whether to trigger a notification for the specific entity. The notification trigger service 126 may evaluate the expected session score against an expected entity score threshold to determine whether the notification should be sent to the entity or whether the notification should be delayed. The expected entity score threshold may be a probability threshold for triggering the notification. For example, if the expected session score represents a probability value that a new entity session will result in 5 pages viewed by the entity and the expected session score is 40%, then the expected session score represents a 40% probability that a new entity session, triggered by a sent notification, will result in 5 or more pages being viewed by the specific entity. If the notification trigger service 126 implements an expected entity score threshold equal to 60%, then given the expected session score of 40% the notification trigger service 126 will send a message to the content item notification system 130 to delay sending the notification to the specific entity. If, however, the expected session score is above the expected entity score threshold, then the notification trigger service 126 may send a message to the content item notification system 130 to trigger sending the notification to the specific entity.

In an embodiment, client devices 142-146 may represent computing devices including, but not limited to, desktop computers, laptop computers, tablet computers, wearable devices, video game consoles, and smartphones. Client devices 142-146 may represent devices entities may use to receive notifications and initiate new entity sessions Entity-Specific Session Features Entity session metrics and entity attribute data stored in the entity data store 105 may be used to generate the set of entity-specific session feature values for training the session-quality prediction model. In an embodiment, the set of entity-specific session features may comprise input and output training data for the session-quality prediction model. Input data may include snapshots of real-time entity features such as the number of unread content items in the target entity's feed and/or the number of unread badge items for the entity at the time of initiating an entity session. Input data may also include offline features that represent aggregated data from entity sessions and entities over a period of time. For example, aggregated data may include average daily number of page views, a daily average number of available content items in a feed, an average duration of entity sessions, and any other metric that may be aggregated over a period of time. Additionally, offline features may include entity profile specific attributes.

In an embodiment, the entity data store 105 may contain a plurality of online feature snapshots and offline features for each of the plurality of entities in the content platform. The following table lists a representative set of online features stored in the entity data store 105:

| Online Feature | Description |
| --- | --- |
| Hour | At what hour a notification was sent |
| Day | Day of the entity session |
| Date | Date |
| Number_feed_update | Number of new content items in the feed |

| Online Feature | Description |
| --- | --- |
| Dist_type_feed_update | Distribution of the types of content items in the feed |
| Number_new_InMessage | Number of content item messages since last visit |
| Number_badgeCount | Number of badge count for an entity since last visit |
| Number_text_notification | Number of text push notification since last visit |
| Time_last_session | Start Time of last session |
| Type_OS | What the operation system of the member is |
| Type_device | Is desktop or mobile (pushDeviceType) |
| Tyepe_notification | Notification type |
| Type_message | Message type like push notification/wechat |

In an embodiment, the entity feature generation service 122 may select a subset of features that includes a Number_feed_update and Number_badgeCount for each entity in the plurality of entities. The selected features may be used to generate the set of entity specific session feature values.

In an embodiment, the offline features for each of the plurality of entities stored in the entity data store 105 may include the following:

| Offline Features | |
| --- | --- |
| Hour_Last_day_most_active | Represents when an entity was most active in the past 24 hours. |
| Day_Last_Week_most_acvtive | Represents when an entity was most active in the past 7 days. |
| Dist_type_Page_last_x_days | In the past "x" days, the distribution of the type of page that an entity viewed. |
| Number_PageView_average_daily | Average daily number of pageviews for an entity. |
| Dist_type_device | Distribution of the device that an entity uses to access the content platform. |
| Average_BadgeCount_daily | Daily average number of badge counts. |
| Average_BadgeCount_Last_x_day | Average number of badge count in last x days. |
| Average_Feed_Liquidity_daily | Daily average number of content item feed updates. |
| Average_Feed_Liquidity_Last_x_days | Average number of content item feed updates in last x days. |
| Average_Number_notification_daily | Daily average number of notifications. |
| Average_TimeSpent_session | Average time spend in an entity session. |
| Is_Member_Active | Is this member an active member or not. |

In an embodiment, output training data may include entity session specific metrics that describe entity session observations that may be used to determine whether a specific entity session was a high-quality entity session. Entity session specific metrics may include, but are not limited to, the number of pages visited, the duration of the entity session, or the number of actions performed during the entity session. For example, entity Jane Smith may have initiated an entity session, in which Jane Smith visited 6 pages, performed 10 actions (which may or may not include the number of pages visited), and the entity session lasted for 20 minutes.

In an embodiment, the entity feature generation service 122 may generate the set of entity-specific session feature values that includes input data represented by online and offline features, and output data represented by entity session specific metrics. For example, the input data related to a specific entity session tracked may include online features of a snapshot of the number of new content items in the specific entity's feed and a snapshot of the badge count of new content items waiting for review. The input data may include offline features including an average daily badge count for the specific entity, an average daily number of content items in the feed, an average entity session duration for the specific entity, a time and duration for the previous entity session, and entity profile attributes. The output data for the specific entity session may include the number of pages visited, the number of actions performed, and the duration of the specific entity session. In an embodiment, the session quality prediction model service 124 may use the input and output data in the set of entity-specific session feature values to train the session-quality prediction model.

Determining Whether to Send a Notification to an Entity

Figure 2:
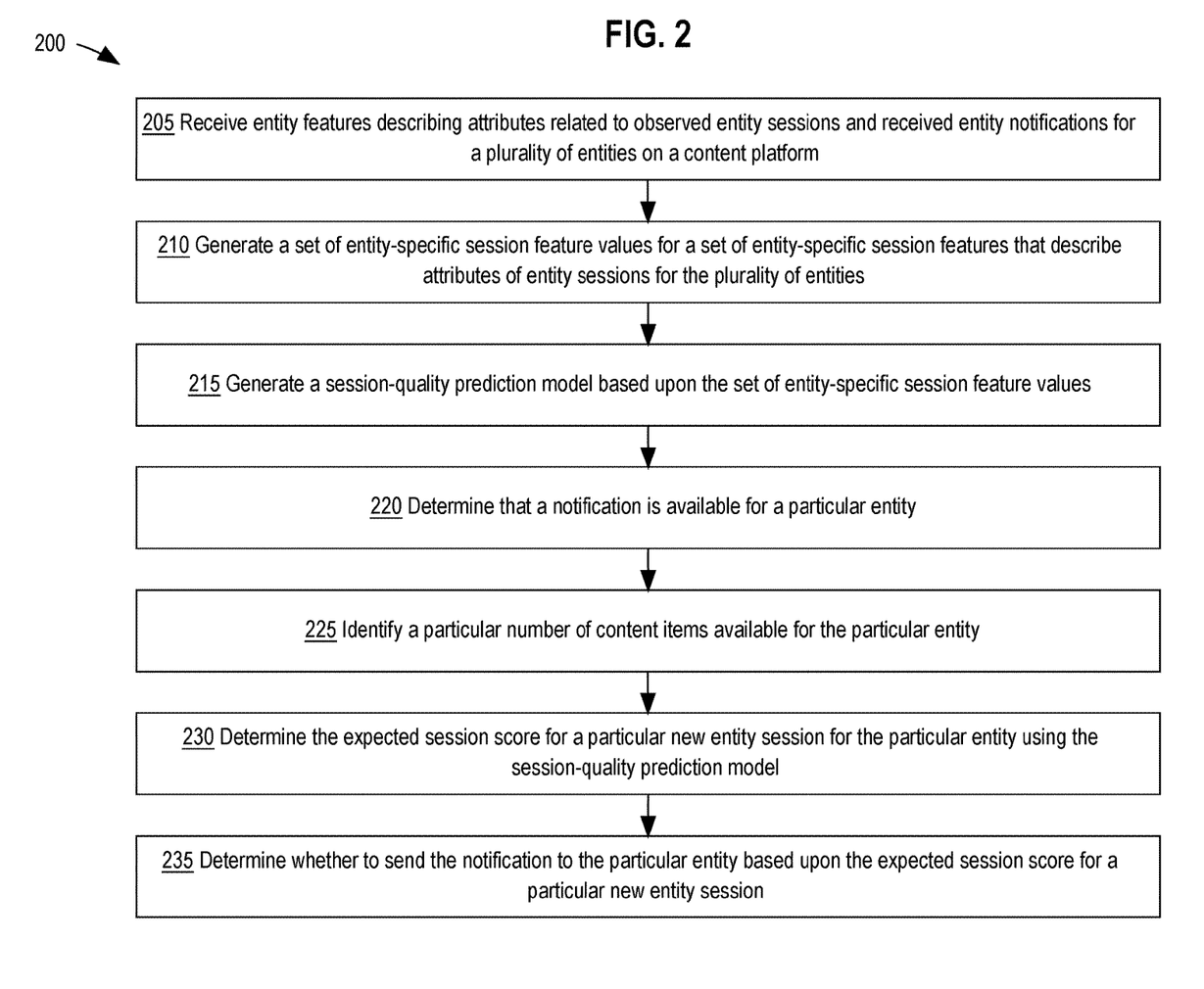
FIG. 2 depicts an example flowchart for generating a session-quality prediction model and determining whether to send a notification to an entity to trigger a high-quality entity session, in an embodiment.

FIG. 2 depicts an example flowchart for generating a session-quality prediction model and determining whether to send a notification to an entity to trigger a high-quality entity session. Process 200 may be performed by a single program or multiple programs. The operations of the process as shown in FIG. 2 may be implemented using processor-executable instructions that are stored in computer memory. For purposes of providing a clear example, the operations of FIG. 2 are described as performed by the entity session evaluation system 120. For the purposes of clarity process 200 is described in terms of a single entity.

Entity-Specific Session Features

In operation 205, process 200 receives entity features describing attributes related to observed entity sessions and received entity notifications for a plurality of entities on a content platform. In an embodiment, the entity feature generation service 122 may request the entity data store 105 to send historical entity session data and entity activity data, which may include online and offline features and entity session specific metrics for each entity session initiated by each entity within the content platform.

In operation 210, process 200 generates a set of entity-specific session feature values for a set of entity-specific session features that describe attributes of entity sessions for the plurality of entities. In an embodiment, the entity feature generation service 122 may generate the set of entity-specific session feature values from the entity features received from the entity data store 105. The entity feature generation service 122 may select specific online and offline entity feature data to be used for training the session-quality prediction model. For example, the entity feature generation service 122 may generate an online feature data structure with a key that includes an identifier and an associated timestamp for the feature, and a feature value that is a feature vector. The entity feature generation service 122 may generate an offline feature data structure with a key that includes an identifier for the feature, and a feature value that is a feature vector. The offline feature data structure may not have an associated timestamp because the offline features may represent aggregated feature values, mean feature values, and entity profile data. In an embodiment, the entity feature generation service 122 may send the set of entity-specific session feature values to the session quality prediction model service 124 to generate a machine-learning model based upon the observations represented by set of entity-specific session feature values.

Session-Quality Prediction Model

In operation 215, process 200 generates a session-quality prediction model based upon the set of entity-specific session feature values. In an embodiment, the session quality prediction model service 124 receives the set of entity-specific session feature values and generates a logistical regression model using the set of entity-specific session feature values and training data. For example, the set of entity-specific session feature values may contain sets of input and output data used to train the session-quality prediction model.

The session quality prediction model service 124 may use the input and output data to generate the session-quality prediction model as a logistical regression model that may output the probability that a given entity session, triggered by a notification, would result in a high quality entity session. As described, the quality of the entity session may be defined as the number of pages visited, the duration of the entity session, or the number of actions performed during the entity session.

In another embodiment, the session quality prediction model may be trained to provide a discrete output value describing the quality of the entity session predicted based upon an entity session metric such as the number of pages visited, the duration of the entity session, or the number of actions performed during the entity session.

Receive Notification Request

In an embodiment, the entity feature generation service 122 may schedule preloading of offline feature data, for the plurality of entities in the content platform, into volatile memory within the entity session evaluation system 120. The preloaded offline feature data may be used in conjunction with real-time notification data as input for predicting an expected session score using the session-quality prediction model. The offline data may be preloaded in order to prevent any potential performance bottlenecks when determining an expected session score using the session-quality prediction model for a particular entity for which there is a potential notification request. If offline data were to be retrieved on-demand from the entity data store 105, which may be configured for long term storage on non-volatile memory, then determining expected session scores would suffer from performance issues related to requesting and receiving offline data from non-volatile storage on the entity data store 105. In an embodiment, the entity feature generation service 122 may periodically update the offline feature data loaded into volatile memory within the entity session evaluation system 120. For example, the offline feature data may be updated on a daily basis, an hourly basis, a weekly basis, or any other configurable schedule.

Referring to FIG. 2, at operation 220 process 200 determines that a notification is available for a particular entity. In an embodiment, the entity feature generation service 122 may receive a request, from the content item notification system 130, to determine whether to send or delay a notification to an entity using client device 142. The request may include notification information, such as the number of available content items for consumption by the particular entity. For example, the request may specify that 5 new content items are waiting in the particular entity's feed and/or 3 new badge updates for content items are pending for the particular entity.

At operation 225, process 200 identifies a particular number of content items available for the particular entity. In an embodiment, the entity feature generation service 122 determines the number of content item waiting to be consumed by the particular entity. For example, the number of content items may include 5 new content items are waiting in the particular entity's feed and 3 new badge updates. In an embodiment, the number of content items available for consumption may be greater than the number of content items in the received notification. This may occur if a previous notification was evaluated and delayed. The particular number of content items available for the particular entity may then include the number of content items from a previous notification as well as the number of content items from the current notification. In an embodiment, the entity feature generation service 122 may associate a timestamp to the number of content items available. The timestamp may be used to determine durations between notifications and durations between the current timestamp and the previous entity session for the particular entity.

Generating an Expected Session Score

At operation 230, process 200 determines the expected session score for a particular new entity session for the particular entity using the session-quality prediction model and the particular number of content items available for the particular entity as input for the session-quality prediction model. In an embodiment, the session quality prediction model service 124 may use the particular number of content items available for the particular entity and their associated timestamp as input for the session-quality prediction model.

In an embodiment, the session-quality prediction model may include as input the particular number of content items available for the particular entity (online feature data) and the offline feature data corresponding to the particular entity, which may be pre-loaded into the entity session evaluation system 120. The session-quality prediction model may then generate the expected session score as output. The expected session score may represent a score describing a probability for a level of interaction during a potential entity session for the particular entity. The expected session score may be based upon a level of interaction threshold implemented by the session-quality prediction model. For example, if the session-quality prediction model may determine a probability that a particular entity session will include 5-page visits, then the level of interaction threshold would equal 5 number of page visits. The expected session score would represent the probability that 5-page visits will occur for the particular entity session based upon trained data related to the particular entity.

In an embodiment, the session-quality prediction model may be configured with a level of interaction threshold that defines a threshold duration of time for the particular entity session, or a threshold number of actions that may occur during the particular entity session. The level of interaction threshold may be configurable based upon the training data and the different types of output variables used to train the session-quality prediction model. In an embodiment, the level of interaction threshold may be determined based upon historical entity session data across all entities within the content platform. For example, a high-quality entity session may be defined as having 5+ page visits within the entity session regardless of which entity is initiating the session.

In another embodiment, the session quality prediction model service 124 implements a customized level of interaction threshold which is tailored to either a classified group of entities or each individual entity. A classified group of entities may represent a certain type of entity, such as highly engaged entities or entities that have low engagement. The customized level of interaction may be based upon an average number of pages visited by entities in the highly engaged group. For instance, if the highly engaged group averages 15-page visits per session, then the customized level of interaction threshold may be set based on the 15-page average and a high-quality entity session for this group may be 18 pages visited during a session. In contrast, the low engagement group may have an average number of page visits equal to 3, then the customized level of interaction threshold may be set to 4 pages where a high quality entity session represents a session where at least 4 pages were visited by an entity.

Similarly, the customized level of interaction threshold may be configured for individual entities. For example, if the particular entity routinely participates in entity sessions where only 3-page visits occur, then causing an entity session that has 5 page visits would represent an entity session that is of higher quality than the average entity sessions for the particular entity. If, however, a second entity routinely participates in entity sessions where 30 page visits occur, then the level of interaction threshold may be modified to define a high-quality session for the second entity as 35 page visits.

In other embodiments, the session-quality prediction model may be trained to output discrete values, where the expected session score may represent an expected number of page visits for the particular entity session. For example, the session-quality prediction model may output, for the particular entity, an expected page visit value of 8-page visits for a new entity session that may be initiated in response to a notification.

At operation 235, process 200 determines whether to send the notification to the particular entity based upon the expected session score for a particular new entity session. In an embodiment, the notification trigger service 126 may receive the expected session score from the session quality prediction model service 124 and compare the expected session score to a configured expected session score threshold. The expected session score threshold may represent a threshold value for determining whether to send a notification to the target entity or whether to delay sending the notification to the target entity. For example, if the expected session score is a probability value that a new entity session will be a high-quality session, where a high-quality session is defined as visiting 5 or more pages, then the expected session score threshold may represent a threshold probability value for sending a notification.

In an embodiment, the notification trigger service 126 may compare the expected session score to the expected session score threshold. If the expected session score is above the session score threshold then the notification trigger service 126 may send a request to the content item notification system 130 to generate and send the notification to client device 142, which is being used by the target entity. If, however, the expected session score is below the expected session score threshold then the notification trigger service 126 may send a request to the content item notification system 130 to delay sending the notification to the target entity using client device 142. The delay request from the notification trigger service 126 may specify a duration for the delay. For example, the notification may be delayed by 4 hours, 1 hour, 1 day, or any other configured duration. In an embodiment, the request for the delay may specify that after the duration of time for the delay, the content item notification system 130 may send a request to the entity feature generation service 122 to determine whether the current time is an optimal time to send the notification. The entity feature generation service 122 may then initiate repeating operations 205-235 to determine whether a notification should be sent to the entity.

In another embodiment, the expected session score may be a factor in determining whether to send a notification to the target entity. The notification trigger service 126 may compute an entity session initiation score as a probability value, which may represent the probability that a notification sent at a particular time will trigger the target entity to initiate an entity session. The expected session score represents the probability that, given a new entity session, the new entity session will be a high-quality entity session. The entity session initiation score may be based upon a regression model that models when to send notifications based upon durations of time between notifications sent to a target entity, the number of previously sent notifications to the target entity, and entity behavior related to entity sessions and receiving notifications.

The notification trigger service 126 may receive an entity session initiation score as a probability value and an expected session score. The notification trigger service 126 may determine whether the expected session score exceeds the expected session score threshold and whether the entity session initiation score exceeds the entity session initiation score threshold. If both the expected session score and the entity session initiation score exceed their respective thresholds, then the notification trigger service 126 may send a request to the content item notification system 130 to generate and send the notification to client device 142 (target entity). If, however, either the expected session score or the entity session initiation score do not exceed their respective thresholds, then the notification trigger service 126 may send a request to the content item notification system 130 to delay sending the notification to client device 142 (target entity).

In another embodiment, the notification trigger service 126 may generate a combined score comprising the entity session initiation score and the expected session score. The combined score may be compared to a combined score threshold in order to determine whether to send the notification request to the content item notification system 130.

In yet another embodiment, the notification trigger service 126 may use the expected session score as a constraint in determining whether to send a notification or to delay sending a notification. The decision to send or delay a notification may incorporate the total number of notifications sent by the content item notification system 130 to all entities within the content platform. The total number of notifications may be factored into determining whether to send a notification to an entity because the content platform may be constrained by limited computing resources to limit the total number notifications sent. The following equation describes one embodiment of optimizing notifications to trigger a new entity session:

$$y_{i,j}=1 \Leftrightarrow \Delta P(\text{visit}) + \alpha P(\text{click}|y_{i,j}=1) > \beta$$

where:

$y_{i,j}$ may represent a decision variable for sending a $j^{th}$ notification to the $i^{th}$ entity. When $y_{i,j}$ is equal to 1, then a notification will be sent. If $y_{i,j}$ does not equal 1, then the notification will not be sent. Variable $y_{i,j}$ is determined to equal 1 when $\Delta P(\text{visit})+\alpha P(\text{click}|y_{i,j}=1)>\beta$ is true.

$\Delta P$ (visit) equals the probability that an entity initiates an entity session within a period of time.

$P(\text{click}|y_{i,j}=1)$ equals the probability that an entity clicks on a notification given that a $j^{th}$ notification was sent to the $i^{th}$ entity.

$\alpha$ represents constant coefficient parameters.

$\beta$ equals a global threshold for sending a notification. When $\Delta P(\text{visit})+\alpha P(\text{click}|y_{i,j}=1)$ is greater than the global threshold $\beta$, then $y_{i,j}$ is determined to be equal to 1 and thus the notification will be sent.

represent constant coefficient parameters.

In an embodiment, above equation may be modified to incorporate the expected session score. The following equation incorporates the expected session score into the above optimization equation for determining whether to send a notification based upon a global threshold for the plurality of entities on the content platform:

$$y_{i,j}=1 \Leftrightarrow \Delta E(\text{value})+\alpha P(\text{click}|y_{i,j}=1)>\beta$$

where:

$\Delta E(\text{value})$ equals the probability that given a new entity session the new entity session will be a high-quality entity session.

In an embodiment, $\Delta E(\text{value})$ may be defined as:

$$\Delta E(\text{value})=E(\text{value}|y_{i,j}=1)-E(\text{value}|y_{i,j}=0)$$

where:

$E(\text{value}|y_{i,j}=1)$ equals the probability that an entity session results in a high-quality session given that a $j^{th}$ notification was sent to the $i^{th}$ entity.

$E(\text{value}|y_{i,j}=0)$ equals the probability that an entity session result in a high-quality session given that a $j^{th}$ notification was not sent to the $i^{th}$ entity. Thus, the above $\Delta E(\text{value})$ represents the difference of the session quality between sending a notification and not-sending a notification.

In another embodiment, the following equation may incorporate the expected session score into the above optimization equation for determining whether to send a notification based upon a personalized entity threshold specific to an entity within the content platform:

$$y_{i,j}=1 \Leftrightarrow \Delta E(\text{value})y_{i,j}+\alpha P(\text{click}|y_{i,j}=1)>\theta_i$$

where:

$\theta_i$ equals a personalized entity threshold for the ith entity.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
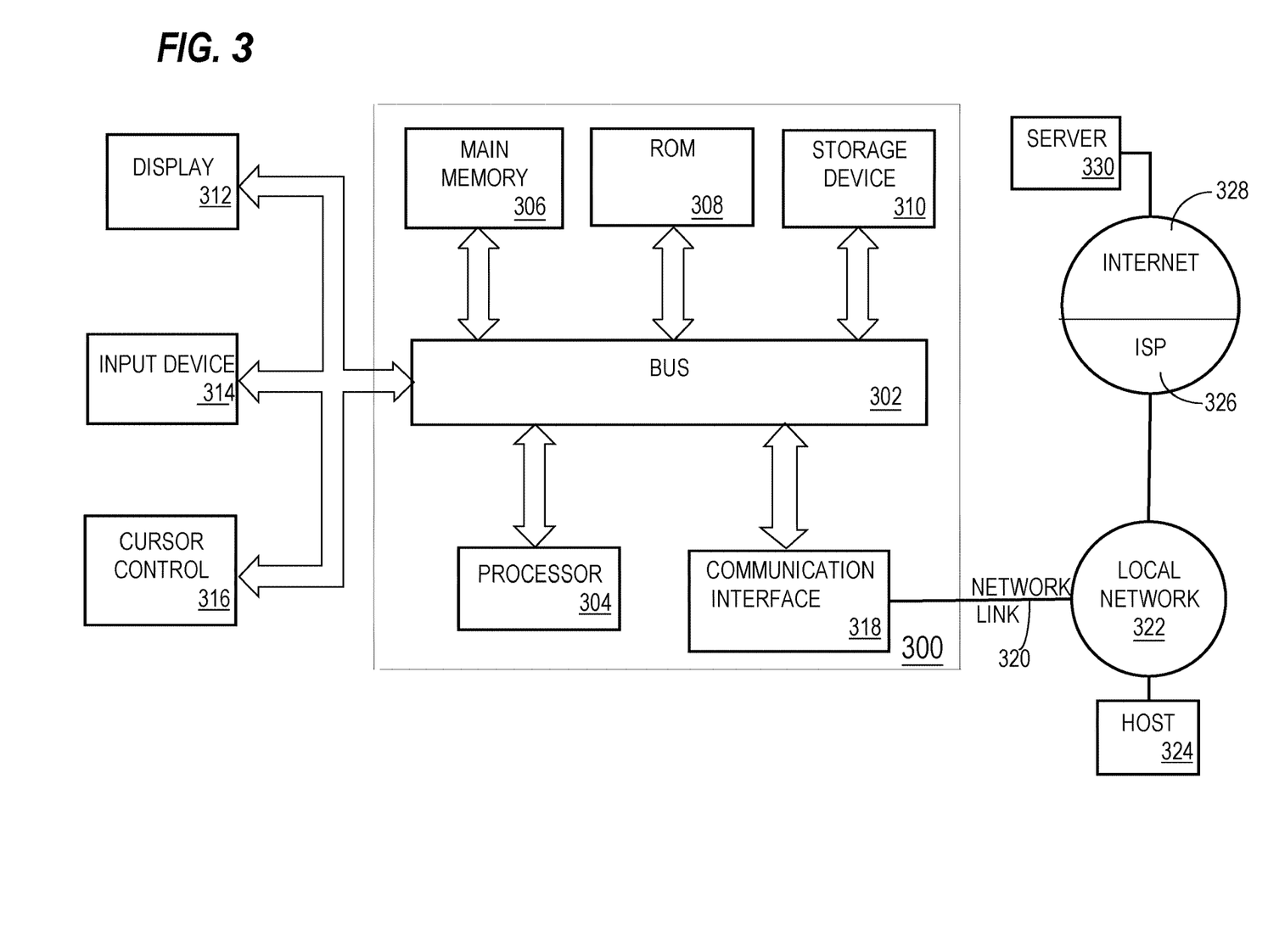
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving entity features describing attributes related to observed entity sessions and received entity notifications for a plurality of entities on a content platform;
   generating a set of entity-specific session feature values, from the entity features, for a set of entity-specific session features that describe attributes of entity sessions for the plurality of entities;
   generating a session-quality prediction model based upon the set of entity-specific session feature values, wherein the session-quality prediction model determines an expected session score for a new entity session for an entity, and wherein the expected session score describes a level of interaction for the new entity session;
   determining that a notification is available for a particular entity;
   identifying a particular number of content items available for the particular entity;
   using the session-quality prediction model, determining the expected session score for a particular new entity session for the particular entity based upon the particular number of content items available for the particular entity; and
   determining whether to send the notification to the particular entity based upon the expected session score for the particular new entity session.

2. The computer-implemented method of claim 1, wherein each entity-specific session feature in the set of entity-specific session features comprises:
   a number of available content items for a specific entity prior to starting an entity session;
   a number of available badge updates for the specific entity prior to starting the entity session;
   an average number of daily badge updates received by the specific entity;
   an average number of daily available content items for the specific entity;
   an average entity session duration value for the specific entity;
   an entity session duration value for a previous entity session by the specific entity; or
   entity features for the specific entity that describe entity attributes related to an entity profile.

3. The computer-implemented method of claim 1, wherein the level of interaction for the new entity session represents a number of page views within the new entity session.

4. The computer-implemented method of claim 1, wherein the expected session score represents a probability value that the new entity session will be greater than a level of interaction threshold.

5. The computer-implemented method of claim 1, further comprising:
   wherein determining whether to send the notification to the particular entity based upon the expected session score comprises:

determining a delta expected session score based on the expected session score;

calculating an overall session score based upon the delta expected session score and determining whether the overall session score is greater than an overall session threshold that describes a desired overall session score representing a desired level of interaction for an entity session; and upon determining that the overall session score is greater than the overall session threshold, sending the notification to the particular entity.

6. The computer-implemented method of claim 1, further comprising:

wherein determining whether to send the notification to the particular entity based upon the expected session score comprises:

determining a delta expected session score based on the expected session score;

calculating an overall session score based upon the delta expected session score and determining whether the overall session score is greater than an overall session threshold that describes a desired overall session score representing a desired level of interaction for an entity session; and upon determining that the overall session score is not greater than the overall session threshold, delaying sending the notification to the particular entity for a particular period of time.

7. The computer-implemented method of claim 1, further comprising:

wherein determining whether to send the notification to the particular entity based upon the expected session score comprises:

determining a delta expected session score based on the expected session score;

determining an entity session initiation probability score that describes a probability that the particular entity will initiate the particular new entity session in response to receiving the notification, based upon historical entity sessions initiated by the particular entity in response to receiving other notifications;

calculating an overall session score based upon the delta expected session score and the entity session initiation probability score and determining whether the overall session score is greater than an overall session score threshold that describes a desired overall session score representing a desired probability of triggering a new entity session that has a desired level of interaction; and upon determining that the overall session score is greater than the overall session score threshold, sending the notification to the particular entity.

8. The computer-implemented method of claim 1, further comprising:

wherein determining whether to send the notification to the particular entity based upon the expected session score comprises:

determining a delta expected session score based on the expected session score;

determining an entity session initiation probability score that describes probability that the particular entity will initiate the particular new entity session in response to receiving the notification, based upon historical entity sessions initiated by the particular entity in response to receiving other notifications;

calculating an overall session score based upon the delta expected session score and the entity session initiation probability score and determining whether the overall session score is greater than an overall session score threshold that describes a desired overall session score representing a desired probability of triggering a new entity session that has a desired level of interaction; and upon determining that the overall session score is not greater than the overall session score threshold, delaying sending the notification to the particular entity for a particular period of time.

9. A system comprising:

one or more computer processors;

a content platform coupled to the one or more processors, wherein the content platform performs operations comprising:

receiving entity features describing attributes related to observed entity sessions and received entity notifications for a plurality of entities on the content platform;

generating a set of entity-specific session feature values, from the entity features, for a set of entity-specific session features that describe attributes of entity sessions for the plurality of entities;

generating a session-quality prediction model based upon the set of entity-specific session feature values, wherein the session-quality prediction model determines an expected session score for a new entity session for an entity, and wherein the expected session score describes a level of interaction for the new entity session;

determining that a notification is available for a particular entity;

identifying a particular number of content items available for the particular entity;

using the session-quality prediction model, determining the expected session score for a particular new entity session for the particular entity based upon the particular number of content items available for the particular entity; and determining whether to send the notification to the particular entity based upon the expected session score for the particular new entity session.

10. The system of claim 9, wherein each entity-specific session feature in the set of entity-specific session features comprises:

a number of available content items for a specific entity prior to starting an entity session;

a number of available badge updates for the specific entity prior to starting the entity session;

an average number of daily badge updates received by the specific entity;

an average number of daily available content items for the specific entity;

an average entity session duration value for the specific entity;

an entity session duration value for a previous entity session by the specific entity; or entity features for the specific entity that describe entity attributes related to an entity profile.

11. The system of claim 9, wherein the level of interaction for the new entity session represents a number of page views within the new entity session.

12. The system of claim 9, wherein the expected session score represents a probability value that the new entity session will be greater than a level of interaction threshold.

13. The system of claim 9, wherein the content platform performs further operations comprising:

wherein determining whether to send the notification to the particular entity based upon the expected session score comprises:
- determining a delta expected session score based on the expected session score;
- calculating an overall session score based upon the delta expected session score and determining whether the overall session score is greater than an overall session score threshold that describes a desired overall session score representing a desired level of interaction for an entity session; and
- upon determining that the overall session score is greater than the overall session score threshold, sending the notification to the particular entity.

14. The system of claim 9, wherein the content platform performs further operations comprising:
wherein determining whether to send the notification to the particular entity based upon the expected session score comprises:
- determining a delta expected session score based on the expected session score;
  - calculating an overall session score based upon the delta expected session score and determining whether the overall session score is greater than an overall session score threshold that describes a desired overall session score representing a desired level of interaction for an entity session; and
- upon determining that the overall session score is not greater than the overall session score threshold, delaying sending the notification to the particular entity for a particular period of time.

15. The system of claim 9, wherein the content platform performs further operations comprising:
wherein determining whether to send the notification to the particular entity based upon the expected session score comprises:
- determining a delta expected session score based on the expected session score;
- determining an entity session initiation probability score that describes probability that the particular entity will initiate the particular new entity session in response to receiving the notification, based upon historical entity sessions initiated by the particular entity in response to receiving other notifications;
- calculating an overall session score based upon the delta expected session score and the entity session initiation probability score and determining whether the overall session score is greater than an overall session score threshold that describes a desired overall session score representing a desired probability of triggering a new entity session that has a desired level of interaction; and
- upon determining that the overall session score is greater than the overall session score threshold, sending the notification to the particular entity.

16. The system of claim 9, wherein the content platform performs further operations comprising:
wherein determining whether to send the notification to the particular entity based upon the expected session score comprises:
- determining a delta expected session score based on the expected session score;
- determining an entity session initiation probability score that describes probability that the particular entity will initiate the particular new entity session in response to receiving the notification, based upon historical entity sessions initiated by the particular entity in response to receiving other notifications;
- calculating an overall session score based upon the delta expected session score and the entity session initiation probability score and determining whether the overall session score is greater than an overall session score threshold that describes a desired overall session representing a desired probability of triggering a new entity session that has a desired level of interaction; and
- upon determining that the overall session score is not greater than the overall session score threshold, delaying sending the notification to the particular entity for a particular period of time.

17. A computer program product comprising:
one or more non-transitory computer-readable storage media comprising instructions which, when executed by one or more processors, cause:
- receiving entity features describing attributes related to observed entity sessions and received entity notifications for a plurality of entities on a content platform;
- generating a set of entity-specific session feature values, from the entity features, for a set of entity-specific session features that describe attributes of entity sessions for the plurality of entities;
- generating a session-quality prediction model based upon the set of entity-specific session feature values, wherein the session-quality prediction model determines an expected session score for a new entity session for an entity, and wherein the expected session score describes a level of interaction for the new entity session;
- determining that a notification is available for a particular entity;
- identifying a particular number of content items available for the particular entity;
- using the session-quality prediction model, determining the expected session score for a particular new entity session for the particular entity based upon the particular number of content items available for the particular entity; and
- determining whether to send the notification to the particular entity based upon the expected session score for the particular new entity session.

18. The computer program product of claim 17, wherein each entity-specific session feature in the set of entity-specific session features comprises:
- a number of available content items for a specific entity prior to starting an entity session;
- a number of available badge updates for the specific entity prior to starting the entity session;
- an average number of daily badge updates received by the specific entity;
- an average number of daily available content items for the specific entity;
- an average entity session duration value for the specific entity;
- an entity session duration value for a previous entity session by the specific entity; or
- entity features for the specific entity that describe entity attributes related to an entity profile.

19. The computer program product of claim 17, wherein the level of interaction for the new entity session represents a number of page views within the new entity session.

20. The computer program product of claim 17, wherein the expected session score represents a probability value that the new entity session will be greater than a level of interaction threshold.

\* \* \* \* \*